(12) United States Patent
Huff et al.

(10) Patent No.: US 9,770,965 B2
(45) Date of Patent: Sep. 26, 2017

(54) SLIDING VISOR

(71) Applicant: Irvin Automotive Products, Inc., Pontiac, MI (US)

(72) Inventors: David Lee Huff, Waterford, MI (US); Leslie Raymond Hinds, Oxford, MI (US); Bryan Wesley Busha, Grand Blanc, MI (US); Donald Joseph Woodward, Washington, MI (US); Joseph Peter Wieczorek, Lake Orion, MI (US)

(73) Assignee: Irvin Automotive Products, LLC, Pontiac, MI (US)

( * ) Notice: Subject to any disclaimer, the term of this patent is extended or adjusted under 35 U.S.C. 154(b) by 0 days.

(21) Appl. No.: 14/921,029

(22) Filed: Oct. 23, 2015

(65) Prior Publication Data

US 2016/0046175 A1   Feb. 18, 2016

Related U.S. Application Data

(63) Continuation of application No. 14/037,530, filed on Sep. 26, 2013, now Pat. No. 9,186,962, which is a continuation of application No. 13/200,177, filed on Sep. 20, 2011, now Pat. No. 8,556,325.

(51) Int. Cl.
*B60J 3/02* (2006.01)
*B60Q 3/252* (2017.01)

(52) U.S. Cl.
CPC ............. *B60J 3/0282* (2013.01); *B60J 3/023* (2013.01); *B60J 3/0208* (2013.01); *B60J 3/0265* (2013.01); *B60Q 3/252* (2017.02); *Y10T 29/49876* (2015.01)

(58) Field of Classification Search
CPC ...... B60J 3/0282; B60J 3/0208; B60J 3/0265; B60J 3/023; B60Q 3/0226; Y10T 29/49876
USPC .............. 296/97.1, 97.5, 97.11, 97.12, 97.13
See application file for complete search history.

(56) References Cited

U.S. PATENT DOCUMENTS

| | | |
|---|---|---|
| 3,710,674 A | 1/1973 | Tabor |
| 3,926,470 A | 12/1975 | Marcus |
| 4,000,404 A | 12/1976 | Marcus |
| 4,174,864 A | 11/1979 | Viertel et al. |
| 4,227,241 A | 10/1980 | Marcus |
| 4,533,275 A | 8/1985 | Foggini |
| 4,598,943 A | 7/1986 | Scholz et al. |
| 4,617,699 A | 10/1986 | Nakamura |

(Continued)

FOREIGN PATENT DOCUMENTS

| | | |
|---|---|---|
| JP | 2001322428 | 11/2001 |
| JP | 2010179794 | 8/2010 |

(Continued)

*Primary Examiner* — Jason S Morrow
*Assistant Examiner* — E Turner Hicks
(74) *Attorney, Agent, or Firm* — Raggio & Dinnin, P.C.

(57) ABSTRACT

A sliding sun visor for use in a vehicle is disclosed. The sun visor includes a first and second visor body shell. At least one of the shells having a retaining channel for engaging and retaining a floating carrier on a visor pivot rod. It is also contemplated that the sun visor may have a snap in vanity system and rotating pin on a D-ring associated therewith. The visor body also may include a wire routing option to route a wire from the electrical system of a vehicle to a light bulb in a vanity.

19 Claims, 13 Drawing Sheets

(56) References Cited

U.S. PATENT DOCUMENTS

| | | | |
|---|---|---|---|
| 4,679,843 A | 7/1987 | Spykerman | |
| 4,715,644 A | 12/1987 | Lobanoff et al. | |
| 4,729,590 A | 3/1988 | Adams | |
| 4,756,570 A | 7/1988 | Cooper | |
| 4,760,503 A | 7/1988 | VandenBerge | |
| 4,973,020 A | 11/1990 | Canadas | |
| 4,993,772 A | 2/1991 | Charen | |
| 4,997,228 A | 3/1991 | Kempkers | |
| 5,011,211 A | 4/1991 | Svensson | |
| 5,059,016 A * | 10/1991 | Lawassani | B60J 3/0282 |
| | | | 248/466 |
| 5,078,445 A | 1/1992 | VandenBerge | |
| 5,082,322 A | 1/1992 | Cekander et al. | |
| 5,161,850 A | 11/1992 | Redder et al. | |
| 5,184,867 A | 2/1993 | Prillard | |
| 5,230,546 A | 7/1993 | Smith | |
| 5,232,192 A | 8/1993 | Akutagawa | |
| 5,331,518 A | 7/1994 | Roark | |
| 5,340,186 A | 8/1994 | Aymerich | |
| 5,409,285 A | 4/1995 | Snyder | |
| 5,428,513 A | 6/1995 | Hiemstra et al. | |
| 5,486,033 A | 1/1996 | Lecorvaisier | |
| 5,544,928 A | 8/1996 | Mori et al. | |
| 5,556,154 A * | 9/1996 | Vaxelaire | B60J 3/0278 |
| | | | 296/97.1 |
| 5,560,704 A | 10/1996 | Hiemstra et al. | |
| 5,580,117 A | 12/1996 | Goclowski | |
| 5,645,308 A | 7/1997 | Fink | |
| 5,653,490 A | 8/1997 | Fink et al. | |
| 5,653,496 A | 8/1997 | Mori et al. | |
| 5,660,424 A | 8/1997 | Aymerich et al. | |
| 5,685,629 A | 11/1997 | Hemmeke et al. | |
| 5,855,443 A | 1/1999 | Faller et al. | |
| 6,010,175 A * | 1/2000 | Bodar | B60J 3/0265 |
| | | | 296/97.11 |
| 6,012,757 A | 1/2000 | Viertel et al. | |
| 6,059,348 A | 5/2000 | Viertel et al. | |
| 6,131,985 A | 10/2000 | Twietmeyer et al. | |
| 6,135,610 A | 10/2000 | Beck et al. | |
| 6,139,083 A | 10/2000 | Fischer et al. | |
| 6,174,019 B1 | 1/2001 | Collet et al. | |
| 6,264,352 B1 * | 7/2001 | Zapinski | B60Q 3/0226 |
| | | | 362/135 |
| 6,334,626 B2 | 1/2002 | Nakajima et al. | |
| 6,368,114 B1 | 4/2002 | Inoue | |
| 6,382,697 B1 | 5/2002 | Mulder et al. | |
| 6,435,593 B2 | 8/2002 | Welter | |
| 6,439,638 B1 | 8/2002 | Kawasaki et al. | |
| 6,474,717 B2 | 11/2002 | Viertel et al. | |
| 6,475,937 B1 | 11/2002 | Preisler et al. | |
| 6,494,521 B2 | 12/2002 | Hennessey | |
| 6,511,029 B2 | 1/2003 | Sawayanagi | |
| 6,547,308 B2 | 4/2003 | Hamelink et al. | |
| 6,604,773 B2 | 8/2003 | Aoki et al. | |
| 6,637,799 B1 | 10/2003 | Tiesler | |
| 6,669,859 B1 | 12/2003 | Tiesler | |
| 6,679,538 B1 | 1/2004 | Sturt | |
| 6,685,257 B1 | 2/2004 | Beland et al. | |
| 6,692,059 B1 | 2/2004 | Mills | |
| 6,698,814 B1 | 3/2004 | Mills et al. | |
| 6,698,815 B1 * | 3/2004 | Mills | B60J 3/0282 |
| | | | 296/1.11 |
| 6,707,674 B1 | 3/2004 | Bryant et al. | |
| 6,796,593 B2 | 9/2004 | Hennessey | |
| 6,799,795 B1 | 10/2004 | Zapinski | |
| 6,840,561 B2 | 1/2005 | Mills et al. | |
| 6,860,546 B1 | 3/2005 | Fero et al. | |
| 6,921,121 B2 | 7/2005 | Schneider et al. | |
| 6,923,490 B2 | 8/2005 | Peterson et al. | |
| 6,948,736 B2 | 9/2005 | DePottey et al. | |
| 7,025,399 B1 | 4/2006 | Crotty, III | |
| 7,032,949 B1 | 4/2006 | Wang et al. | |
| 7,036,877 B2 | 5/2006 | Schultz et al. | |
| 7,055,884 B2 | 6/2006 | Zapinski et al. | |
| 7,059,652 B2 | 6/2006 | Aoki et al. | |
| 7,086,681 B2 | 8/2006 | Fernandez et al. | |
| 7,108,308 B2 | 9/2006 | Remy | |
| 7,201,427 B2 | 4/2007 | Wang et al. | |
| 7,217,017 B2 | 5/2007 | Smith | |
| 7,281,751 B2 | 10/2007 | Hamelink et al. | |
| 7,311,427 B2 | 12/2007 | Barker et al. | |
| 7,320,493 B2 | 1/2008 | Kumakawa et al. | |
| 7,338,108 B2 | 3/2008 | Iwatsuka et al. | |
| 7,384,088 B2 | 6/2008 | Remy | |
| 7,416,239 B2 | 8/2008 | Lanser et al. | |
| 7,416,319 B2 | 8/2008 | Richard et al. | |
| 7,458,627 B2 | 12/2008 | Tiesler et al. | |
| 7,461,886 B1 | 12/2008 | Wang et al. | |
| 7,534,018 B2 * | 5/2009 | Nicola | B60J 3/0282 |
| | | | 362/137 |
| 7,537,263 B2 | 5/2009 | Delphia | |
| 7,556,308 B2 | 7/2009 | Lee et al. | |
| 7,703,832 B2 | 4/2010 | Shorter et al. | |
| 7,717,491 B2 | 5/2010 | Beck et al. | |
| 7,784,847 B2 | 8/2010 | Asai | |
| 7,798,551 B2 | 9/2010 | Okazaki et al. | |
| 7,823,954 B2 | 11/2010 | Jones et al. | |
| 7,854,464 B2 | 12/2010 | Mori | |
| 7,866,724 B2 | 1/2011 | Olep et al. | |
| 9,186,962 B2 | 11/2015 | Huff et al. | |
| 2005/0034555 A1 | 2/2005 | Staker | |
| 2006/0061008 A1 | 3/2006 | Karner et al. | |
| 2009/0121513 A1 | 5/2009 | Olep | |
| 2010/0013263 A1 | 1/2010 | Okazaki et al. | |
| 2010/0096878 A1 | 4/2010 | Wieczorek et al. | |
| 2010/0117395 A1 * | 5/2010 | Wieczorek | B60J 3/0208 |
| | | | 296/97.5 |
| 2011/0227362 A1 | 9/2011 | Rockafellow et al. | |
| 2011/0260492 A1 | 10/2011 | Ogawa et al. | |

FOREIGN PATENT DOCUMENTS

| | | |
|---|---|---|
| JP | 201142338 | 3/2011 |
| JP | 2011042335 | 3/2011 |
| WO | WO2010045438 | 4/2010 |

* cited by examiner

SLIDING VISOR

This application is a continuation of U.S. application Ser. No. 14/037,530—Filed Sep. 26, 2013, which is a continuation of U.S. application Ser. No. 13/200,177—Filed Sep. 20, 2011 Now U.S. Pat. No. 8,556,325

BACKGROUND OF THE INVENTION

1. Field of the Invention

The present invention generally relates to a movable sun visor for interior use in a vehicle, and more particularly relates to a sun visor wherein the visor body includes two visor body halves or shells adapted to close about and slidably retain a carrier attached to a pivot rod.

2. Description of Related Art

Sun visors are well known and widely used in the prior art. Many different types of designs have been successfully employed in vehicles over the years. Many of these prior art visors have been developed in a variety of ways through which visor bodies and other interior components may be constructed and mounted within the vehicle. Advances in design can often add complexities to the manufacturing processes for interior components. There has been and continues to be a premium in the automotive industry on cost savings, and improvements in the efficiency and speed in the manufacturing processes for such components therein. One area of particular focus in the automobile technology field has been reducing the number and complexity of steps required to assemble interior components such as sun visors or visors for use in vehicles.

Generally, in the prior art, manufacturing simplicity continues to drive innovations in the automotive industry, loss of quality and performance in the manufacturing of components for the sake of facilitating production is seldom, if ever, acceptable. There is a substantial body of prior art relating to the specific structure of the visor to provide a strong, light weight construction that matches or compliments the interior vehicle trim in a cost effective manner. Of particular interest has been the clam shell type construction, which involves the molding of two shell pieces or clam shell halves, which are joined to form the visor body. In one typical clam shell design, the visor halves are formed as a single piece attached along a longitudinal edge and then folded to form the visor body. The exterior surface can be molded to provide a suitable visor surface, or a desired outer covering may be added in a variety of different ways known in the prior art.

The clam shell design allows the visor body to be constructed relatively quickly and easily, however the various components that are attached to the visor clam shell halves must in some cases be incorporated with several assembly steps prior to securing the clam shell halves together. For example, some of the known designs require insertion of additional mounting or journaling pieces for retention of the visor pivot rod within the visor body. The construction of the visors having such a design is relatively time intensive. Moreover, the various slides, journals, retainers, etc., utilized in the construction may add significant expense and weight to the overall visor, along with unwanted noise, and increase the number of components necessary to build one therein.

In some cases eliminating parts can reduce the expense of manufacturing and constructing a visor. The decrease in size and weight, however can be accompanied by a decrease in strength. Rotatable visors are a concern where flimsy construction of the visor core and slider components may be insufficient to withstand repeated torque actions on the visor shells themselves, and in some cases cause dislodging or breaking of the components. Furthermore, the consumers of motor vehicles require visors that are nearly silent in operation and do not involve unwanted noises or sloppiness when pivoting or rotating the visors. Hence, it is thus desirable in the art to provide a visor that is lightweight, easy to manufacture and uses relatively few components, yet utilizes a design imparting significant durability to withstand heavy and repeated use and to provide a solid construction with tight tolerances throughout the entire system. Furthermore, there is a need in the art for an improved sliding visor that has a floating carrier that is self aligning and transforms lateral and vertical variations into a single resultant force factor that is perpendicular to a spring mechanism within the floating carrier. There also is a need in the art for a sun visor that uses a vanity system that snaps into the shell of a visor body without screws being used as fasteners.

SUMMARY OF THE INVENTION

One object of the present invention may be that it provides an improved sliding visor.

Another object of the present invention may be that it provides a sliding visor that has a floating carrier slidingly arranged over a pivot rod.

Yet a further object of the present invention may be that it provides a sliding visor that has a floating carrier with a spring arranged between first and second fingers of a body of the carrier, wherein the spring exerts a force against the fingers in an outward direction and into contact with a visor body.

Still another object of the present invention may be that the floating carrier has surfaces and fingers that are arranged at an approximate 45° angle and interact with 45° angled bearing surfaces of a visor body half shells.

Still another object of the present invention may be that it provides a sliding visor that has a floating detent engaging the pivot rod and arranged within the floating carrier while being independent of the carrier.

Still another object of the present invention may be that it provides a sliding visor that includes a D-ring having a pin which rotates 360° with respect to the body of the D-ring.

Still another object of the present invention may be that it provides a pivot point lever arm connected to a floating carrier to guide a wire arranged on one end, wherein the wire is passed through a pivot rod to allow for lighting of the vanity of the visor.

Still another object of the present invention may be that it provides for a sliding visor that includes a tube protector arranged over a wire and between a floating carrier and vanity of the visor.

Yet another object of the present invention may be that it provides a sliding visor that has a vanity that includes a frame, a door, a mirror and a light therein, wherein the vanity is snapped in to one shell of the visor body without screws being used as fasteners.

Still another object of the present invention may be that it provides for a sliding visor that has a mirror and a vanity that is secured to a vanity frame without adhesive.

Still another object of the present invention may be that it provides for a sliding visor that is capable of edge tucking of a cover material along front and/or side edges thereof.

Still another advantage of the present invention may be that it provides a sliding visor that incorporates ultrasonic weld joints and profile snaps that allow for a robust, zero flex interfacing between the two half shells of the visor body.

According to the present invention, the foregoing and other objects and advantages are obtained by a novel design for a sliding visor for use in a vehicle. The sliding visor generally comprises a pivot rod and a floating carrier slidingly arranged on the pivot rod. The visor further comprises a first and second shell engagable to form a visor a body. The floating carrier is slidingly retained between the first shell and the second shell, wherein the floating carrier having a first surface and a first finger engaging the first shell and a second surface and a second finger engaging the second shell of the visor body. The visor further comprises a floating detent engaged with the pivot rod and arranged within the floating carrier without being directly interfaced with the floating carrier. The visor also comprises a D-ring secured to the visor body wherein the D-ring having a rotating pin. The visor also comprises a snap in vanity secured to the visor body without screws.

One advantage of the present invention may be that it provides for an improved sliding visor.

A further advantage of the present invention may be that it provides for a sliding visor that has a floating carrier slidingly arranged on a pivot rod of the visor.

Yet another advantage of the present invention may be that it provides for a floating carrier being slidably retained between a first and second shell and the floating carrier having a first surface and a first finger engaging the first shell and a second surface and a second finger engaging the second shell.

Yet another advantage of the present invention may be that it provides for a sliding visor that has a floating carrier with a spring arranged between first and second fingers and a body of the floating carrier.

Still another advantage of the present invention may be that it provides for a sliding visor that has a floating carrier that has surfaces and fingers that are arranged at approximate 45° angle with respect to a center line of the floating carrier and engage with bearing surfaces having the same approximate 45° angle on the half shells of the visor body.

Still another advantage of the present invention may be that it provides a sliding visor that has a bumper which provides dampening and helps absorb and resist input vibration signals within the sliding visor components.

Still another advantage of the present invention may be that it provides for a sliding visor that has ultrasonic joints and profile snaps to secure two half shells to one another to create a robust and generally near zero flex interface for the visor body.

Still another advantage of the present invention may be that it provides for a sliding visor that has a floating detent that engages the pivot rod and is arranged within the floating carrier without being directly interfaced to the floating carrier.

Still another advantage of the present invention may be that it provides a sliding visor that uses a D-ring secured to the visor body, wherein the D-ring has a pin which rotates 360° with respect to the visor body.

Still another advantage of the present invention may be that it provides for a sliding visor that has a pivot point lever arm pivotally connected to a floating carrier to guide a wire to a vanity lighted mirror.

Still another advantage of the present invention may be that it provides a sliding visor that has a tube protector arranged over a wire that is arranged between a floating carrier and a vanity.

Still another advantage of the present invention may be that it provides a snap in vanity that includes a frame, a door, a mirror and a light.

Still another advantage of the present invention may be that it provides a sliding visor that includes a mirror that is secured to a frame of the vanity without adhesives.

Still another advantage of the present invention may be that it provides for a visor body having two half shells that have a plurality of teeth arranged around the periphery of a front edge and sides thereof to allow for tuck edging of a cover material over the outer surface of the visor body.

Other objects, features and advantages of the present invention will become apparent from the subsequent description and appended claims, taken in conjunction with the accompanying drawings.

BRIEF DESCRIPTION OF THE EMBODIMENT(S)

Figure 1:
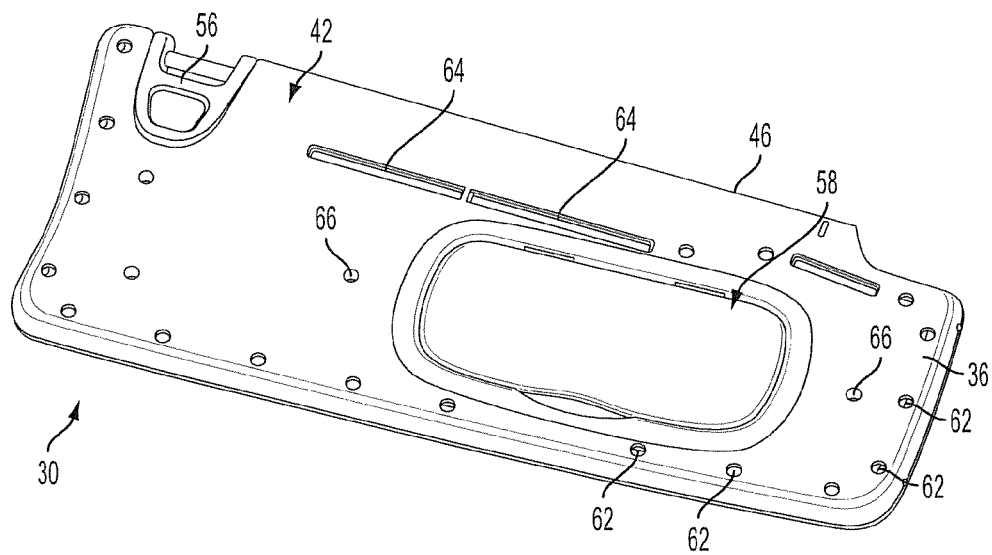
FIG. 1 shows a plan view of a visor according to the present invention.
Figure 2:
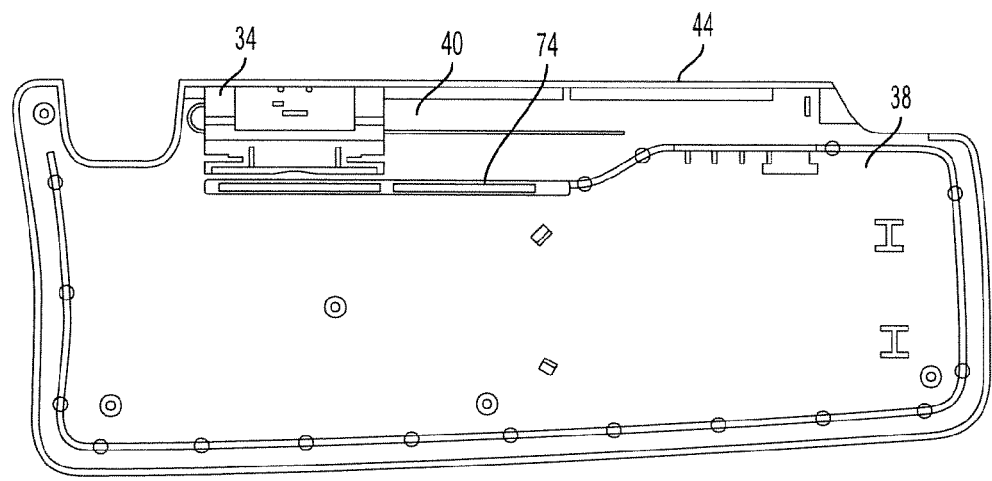
FIG. 2 shows an open view of a visor according to the present invention.
Figure 4:
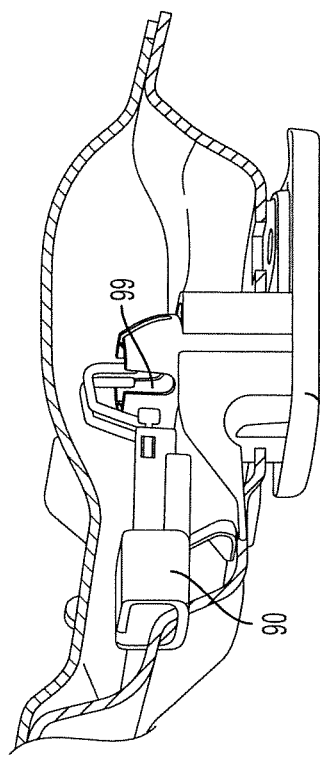
FIG. 4 shows a plan view of a bracket and integrated wire connector according to the present invention.

Referring to the drawings, there is shown a sliding visor 30 according to an embodiment of the present invention. Generally, the present invention broadly provides a clam shell type vehicle sun visor 30 having a pivot rod 32 mounted to a floating carrier 34, wherein the pivot rod 32 and floating carrier 34 are slidably captured during assembly with the single step of attaching visor shell portions 36, 38 together. The floating carrier 34 thus rides in the visor body 42 itself rather than a separate carrier and is preferably retained between surfaces and/or features, such as channels 40 molded integrally within the shell portions 36, 38. Similarly, the pivot rod 32 rides in the visor body 42, and a separate bracket, bezel or similar piece is not necessary to support the pivot rod 32. Related aspects of the present invention include methods for manufacturing a sun visor 30 also described herein. Furthermore, it should be noted that the visor 30 as shown in the present application can be used in any known type of vehicle, such as but not limited to, automotive vehicles, maritime vehicles, aerospace vehicles, military vehicles and any other known vehicle that has a need for the sun to be blocked from filtering into the interior compartment of the vehicle. It should also be noted that generally all of the components of the sliding visor 30, according to the present invention, maybe made of a plastic material that is capable of either being extruded, molded or shaped by any known manufacturing process. However, any other known metal, ceramic, plastic, composite, natural material or any other known material may also be used for any of the parts or components of the sliding visor 30 described herein.

In one embodiment shown in the Figures, the visor 30 includes a first and second shell halve or shells 36 and 38 engagable to form the elongate visor body 42. Various molded features may be included on each shell to facilitate engagement of the shells 36, 38. For example, complimentary structures may be formed on the respective visor shells 36, 38 that allow a snap fit therebetween. In one contemplated embodiment, the shells 36, 38 may be formed having integral or connected longitudinal peripheral edges 44 and 46, respectively. Other embodiments are contemplated in which the shells 36, 38 are formed as separate, unconnected members. Although connected shells are preferred, the visor 30, as shown in the Figures is illustrated as having separate, unconnected shells for clarity and ease of description. The visor 30 further includes a pivot rod 32 that is arranged into one end of the visor body 42 and connected on the opposite end to a head liner or roof of the vehicle into which the sun visor 30 is arranged. The visor 30 is preferably formed such that the shells 36, 38 can be closed about the pivot rod 32 and as such capture the pivot rod 32 therebetween in a single assembly step. Also, the visor 30 includes a carrier 34 which is slidably captured by the closure or engagement of the shells 36, 38 slidably securing the carrier 34 between the shells 36, 38 without the need for installation of an internal slider member, retainer or similar mechanism for mounting the pivot rod 32. All of the component parts of the visor 30 are manufactured from known materials and by known processes, such as but not limited to, any type of plastic, metal, ceramic, composite, natural materials, or any other known material and by any type of molding technique, forming technique, chemical or mechanical process to design and make the components as described herein.

Generally, the shells 36, 38 are formed by injection molding a plastic material in a conventional manner. For example, the shells 36, 38 may be formed from a molded polyethylene or by some other suitable method and/or material. The first and second shells 36, 38 generally include retaining surfaces in any known shape, such as arcuate retaining surfaces, flat or angled retaining surfaces, all of which may be elongate, or trough shaped surfaces extending parallel to an edge of the visor shells 36, 38 and defining a portion of a cylinder or wall. It should further be appreciated that the present invention may encompass designs with retaining surfaces that vary in dimension between longer, trough-shaped features and more narrow arcuate ledges as shown in the Figures. It should further be noted that an arcuate pair of surfaces may be aligned near one end of the visor shells 36, 38 to allow for the pivot rod 32 to be properly supported and capable of rotating and sliding with relation to the visor body 42. The visor half shells 36, 38 also have a channel 40 formed near one edge thereof, wherein the channel 40 may have a first and second bearing surface 48. These bearing surfaces 48 are arranged at any known angle with relation to a center line of the visor body 42. In one contemplated embodiment, these angled surfaces will be arranged on each side of a channel 40 that extends a predetermined distance along a longitudinal axis of the visor body 42 and these angled surfaces will be approximately at a 45° angle with relation to a center line of the visor body 42. It should be noted that these angled bearing surfaces 48 may be arranged on each inner surface of both shell halves 36, 38 of the visor body 42. One of the shells of the visor body 42 also may include a flat surface 50 extending from one of the angled surfaces 48 a predetermined distance. A pocket 52 may be formed adjacent to this flat surface 50, such that another flat surface 54 extending from the angled surface 46 of the opposite shell half will be arranged therein, thus creating a complete closed channel 40 having four angled surfaces 48 with approximate 45° angles and a floating carrier 34 having complimentary surfaces arranged therein. It should be noted that the 45° angle is only one of many contemplated angles to be used for the angled bearing surfaces 48 on the inner surface of the visor shell halves 36, 38. Any known angle from zero to 360° may be used for the angled bearing surfaces 48, which interact with a floating carrier 34 of the sliding visor 30 according to the present invention. It should be noted that the visor half shells 36, 38 may include other surfaces that receive and hold various components of the sliding visor 30, such as but not limited to the pivot rod 32, a D-ring 56, a vanity 58, and cover material arranged over the visor body 42 to complete assembly thereof. At the end of one portion of the channel 40 defined by the first and second shells 36, 38 is a stop member 60. This stop member 60 extends a predetermined distance from a bottom surface of the channel 40 to ensure the floating carrier 34 only slides a predetermined distance with respect to the visor body 42. The stop member 60 may be of any known shape.

The shell halves 36, 38 that form the visor body 42 of the sliding visor 30 according to the present invention also may include a plurality of hybrid snap and ultrasonic weld joints. In one contemplated embodiment, a plurality of profile snaps 62 may be arranged around the front edge and the side edges of the arcuate shells of the visor shells 36, 38. One of the shells may have the male portion of the profile snap 62 while the other shell will have the female portion, which receives the male portion and holds the first shell 36 to the second shell 38 in order to provide robust, zero flex interface between the two half shells 36, 38 to form a robust visor body 42. These snaps 62, which are arranged around the outer profile, may allow for enough flex for the front edge and side edges to allow for a tucking process to occur as described hereafter. The visor body 42 also includes at least one weld bar joint 64 and at least one weld boss joint 66 arranged at predetermine positions on the visor body 42. In one contemplated embodiment, a first and a second weld bar 64 may be arranged directly below and adjacent to the channel 40 which holds the floating carrier 34 and pivot rod 32 therein. The weld bosses 66 may be arranged at various positions on the half shells 36, 38 to ensure a robust, generally near zero flex interface between the two half shells 36, 38. The weld bars 64 and weld bosses 66 may have a male portion formed or molded on one of the half shells and a female portion for receiving the male portion arranged on the other shell half. In one contemplated embodiment, a pin and orifice setup may be used to create the weld bar female and male portions. The male portion may have a locking surface arranged near an end thereof while the female portion may have a locking shoulder that defines and will hold against the locking surface of the male portion to allow for the ultrasonic welding of the material to ensure a robust, zero flex interface between the two visor halves 36, 38. The weld bar 64 may be of any shape and the weld boss 66 may be of any shape, generally the weld boss 66 has a cylindrical or circular shape, while the weld bar 64 extends in a generally straight line a predetermined distance. It should be noted that other contemplated methodologies and fasteners may be used to secure the two visor shell halves 36, 38 to one another, but the embodiment shown includes the weld joints as described above and the profile snaps 62 arranged around the outer periphery thereof. It should be noted that one of the shell halves also may include a predetermined shaped orifice or cavity 68 on an outer surface thereof that may be used to receive and secure a vanity 58 to the visor body 42. The orifice or cavity 68 for receiving the vanity 58 may include a plurality of locking surfaces or locking arms that may interact with locking surfaces or flanges of a frame 70 of the vanity 58 to ensure the vanity 58 is capable of being secured to the outer surface of one of the shells of the visor body 42. These locking surfaces and fingers may take any known shape and are arranged such that both illuminated and non-illuminated visor vanities may be arranged therein. Other surfaces may also be molded into the visor half shells 36, 38 to allow for placement of wires 74 to illuminate a visor vanity mirror 72 or to receive a universal garage door opener or other components directly into the visor body 42. The visor half shells 36, 38 according to the present invention, may also include a plurality of teeth 76 arranged around an outer periphery of the front edge and side edges of each of the shell halves 36, 38. These teeth 76 generally have a pyramidal or triangular like shape tooth and may either be directly aligned with one another from each half shell 36, 38 or offset with one another from each half shell 36, 38 depending on the design requirements and the tucking process to be used. It should be noted that the tuck edge teeth 76 may have any known shape other than triangular, pyramidal or conical, as shown in the drawings and may be offset or aligned with one another depending on the design requirements of the visor body 42. These teeth 76 arranged around the outer periphery may form a tuck edge wherein the outer covering material used to cover the visor 30 during its final assembly process may be tucked into the gap formed between the teeth 76 and the teeth 76 on each shell half 36, 38 may hold the material to present a taught, clean appearance on the outer surface of the visor body 42 and a clean seam or line alone the outer front edge and/or sides of the visor body 42, which is generally visible to the user of the automotive vehicle. This use of the teeth 76 to form a tuck edge and to have the cover material placed by a tuck edge process into engagement with the teeth 76 may create an aesthetically pleasing visor body 42 having a taught, clean outer cover material arranged thereover. It should be noted that in one contemplated embodiment the cover material may be formed in the shape of a sock and the sock is arranged over one end of the visor body 42 then the tuck process is used to create the clean front edge and side edges of the visor 30. However, any other known tuck process and cover material that is not in the form of a sock may also be used depending on the design requirements and the visor 30 being created.

Figure 6:
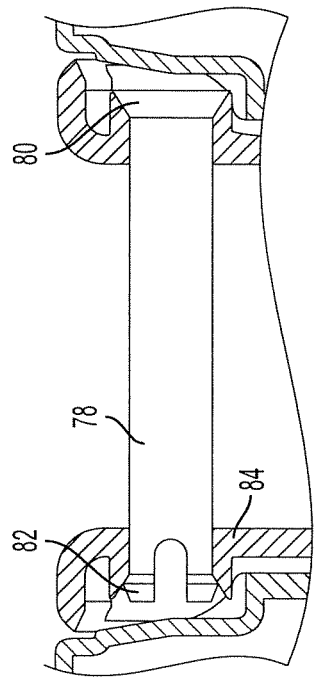
FIG. 6 shows a rotating pin of the D-ring according to the sliding visor of the present invention.
Figure 3:
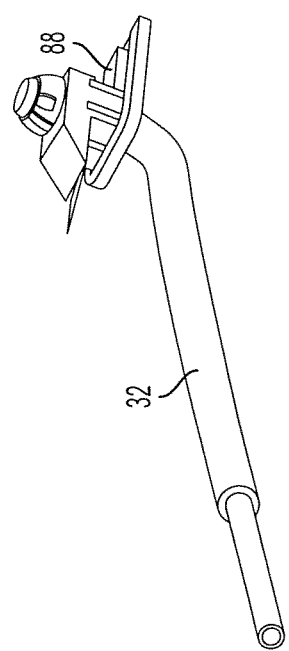
FIG. 3 shows a plan view of a bracket and pivot rod or arm according to the present invention.
Figure 5:
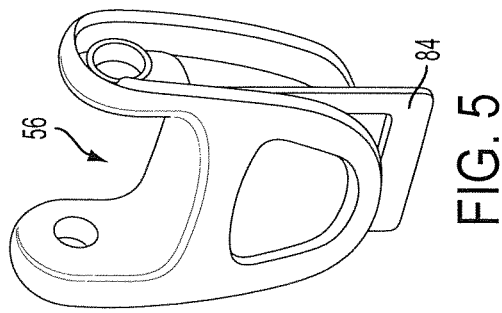
FIG. 5 shows a D-ring for use in the sliding visor according to the present invention.
Figure 7:
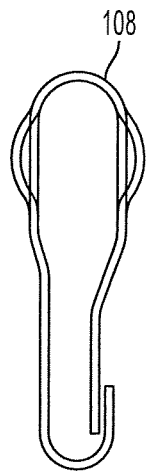
FIG. 7 shows a side view of a detent according to the present invention.
Figure 8:
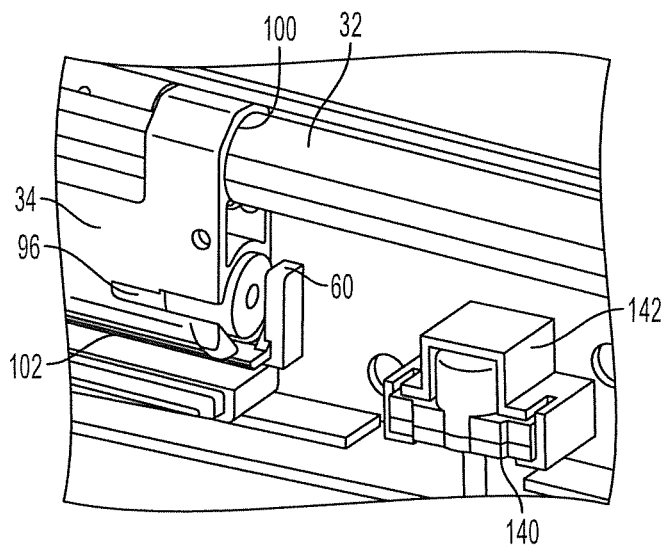
FIG. 8 shows a close up of a floating carrier according to the present invention.
Figure 9:
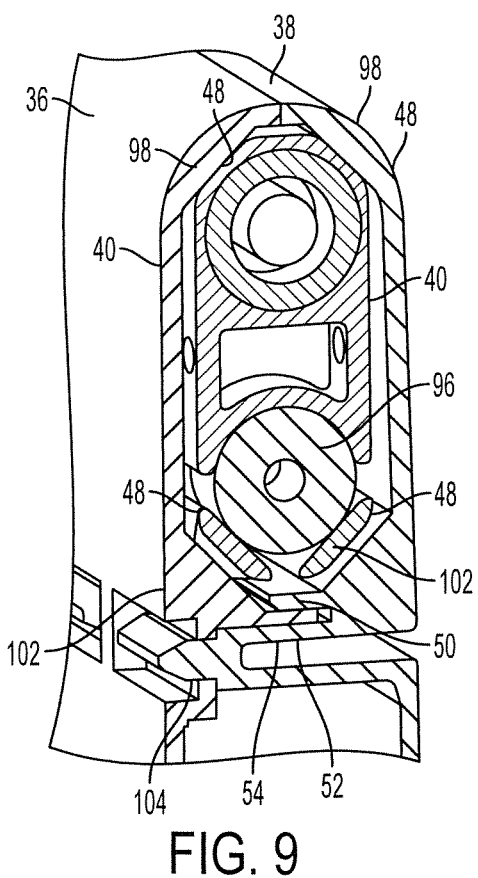
FIG. 9 shows a partial cross section through a sliding visor according to the present invention.
Figure 10:
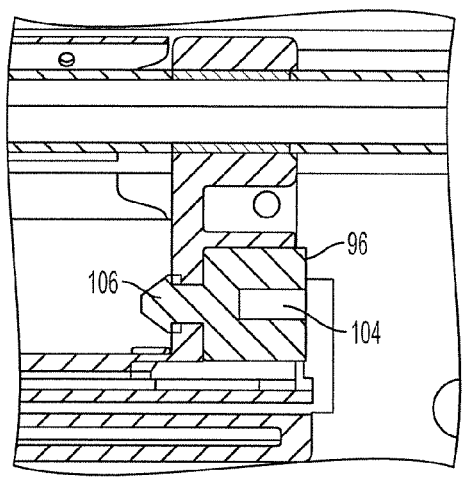
FIG. 10 shows a cross sectional view of the sliding visor according to the present invention.
Figure 11:
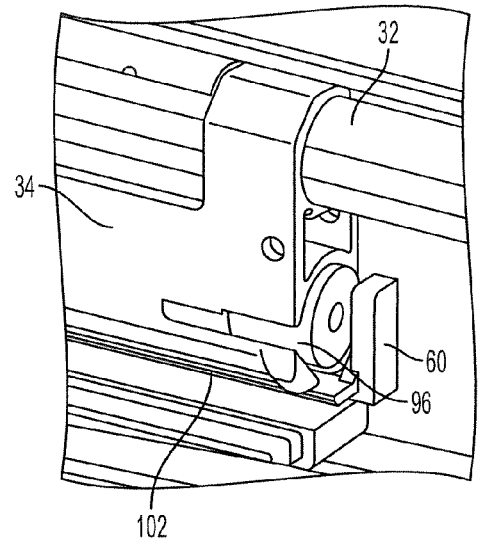
FIG. 11 shows a side view of a floating carrier arranged within one half of the visor shell according to the present invention.
Figure 12:
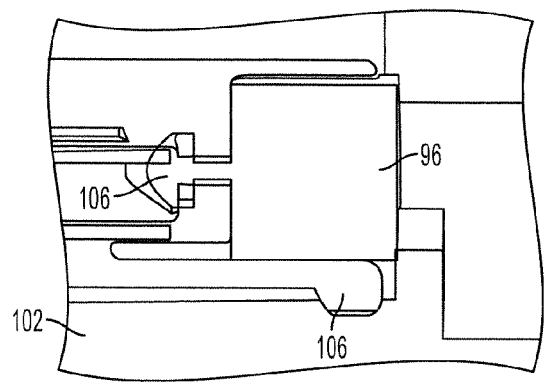
FIG. 12 shows a cross sectional view of the floating carrier and visor according to the present invention.
Figure 13:
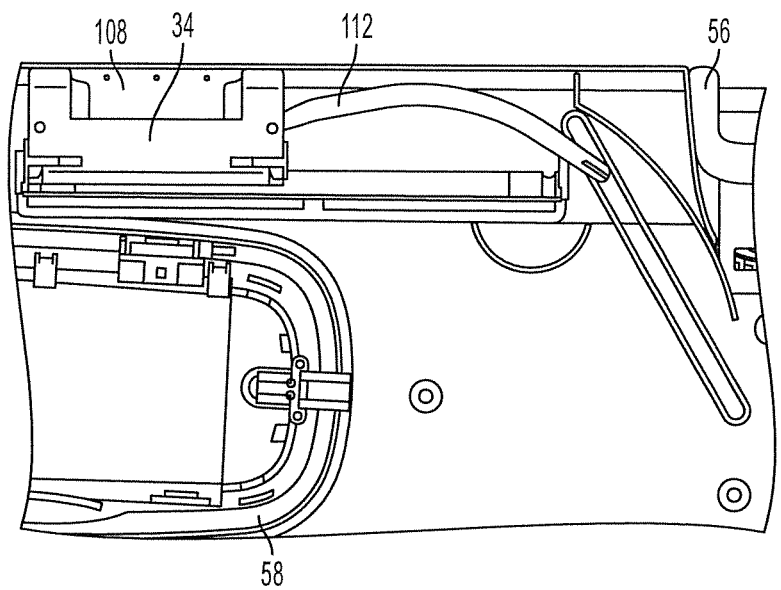
FIG. 13 shows a side view of one half of a visor shell according to the present invention.
Figure 14:
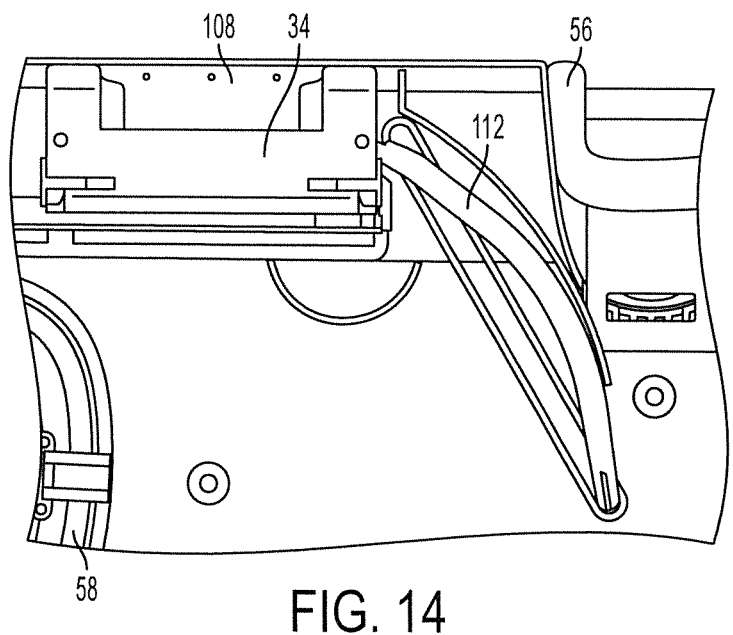
FIG. 14 shows a close up of a side view of one half visor shell according to the present invention.
Figure 15:
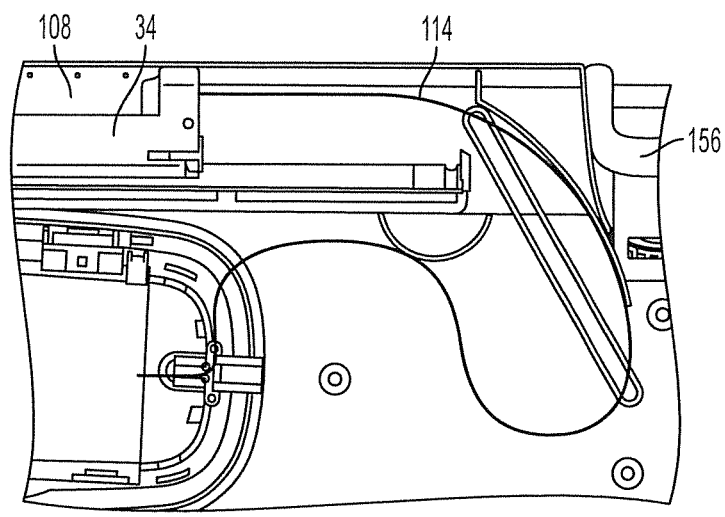
FIG. 15 shows an alternate embodiment of a side view of a visor half shell according to the present invention.

The sliding visor 30, according to the present invention, may also include a D-ring 56 secured to the visor body 42 on a top edge thereof. The D-ring 56 may be any known D-ring. The D-ring 56 of the present invention may partially assist in holding the cover material in a taught, clean manner over the outer surface of the visor half shells formed into a visor body 42. The D-ring 56 also includes a rotating pin 78 which rotates 360° with respect to the body of the D-ring 56 and the visor body 42. As shown in FIGS. 5 and 6, the rotating pin 78 may have a predetermined length and may or may not have a bore running along mid point thereof or only along a predetermined portion of the mid point of the rotating pin 78. The rotating pin 78 may have a predetermined diameter and may have a skirt like flange 80 arranged on one end thereof. On the opposite end of the rotating pin 78 may be a locking shoulder 82 that includes a circumferential flange extending from an outer surface thereof that interacts with a locking surface 84 of the body of the D-ring 56. In operation, the assembler may take the rotating pin 78, pass it through an orifice in an arm of the D-ring 56 and insert it into the opposite orifice of the opposite arm of the D-ring 56 until the locking shoulder 82 interacts with the locking surface 84 of the D-ring 56. This will secure the rotating pin 78 to the D-ring 56 but allow for rotation of the rotating pin 78 with relation to the D-ring 56 body and hence, the visor body 42. It should be noted that any known plastic, ceramic, composite, metal or natural material may be used to form both the rotating pin 78 and the D-ring 56 according to the present invention. The D-ring body generally has a saddle like shape with a leg 86 extending down that may interact with a locking member arranged on one of the half shells 36, 38 of the visor body 42. It should be noted that any other shape may be used for the D-ring 56 body, not just that shown in the drawings.

The sliding visor 30 also includes a pivot rod 32 which is attached at one end to a bracket 88 and connector 90 which is secured to the headliner or roof of a vehicle. The bracket 88 may have a connector 90 secured thereto to connect the electrical system of the vehicle via a wire 74 to the bracket 88, the wire 74 is then passed through the pivot rod 32, which generally is hollow according to the present invention. However, it should be noted that a solid pivot rod 32 may be used, as long as it will be capable of passing electricity therethrough to allow for illumination of the vanity mirror 72 if necessary. The bracket 88 may be secured to the roof of the vehicle via fasteners or any other known methodology. The bracket 88 includes an orifice 94 that will receive one end of the pivot rod 32 near an elbow of the pivot rod 32, wherein the pivot rod 32 generally has an angle of 60°-120° at the elbow. The pivot rod 32 may be secured and capable of rotation within the orifice 94 of the bracket 88 and may also be swung between a front windshield of the vehicle and a side window of the vehicle to block the sun from any angle. The pivot rod 32 may be of any known length and diameter depending on the design of the visor 30 and the automobile into which it is arranged. The wire 74 is connected from the electrical system of the automobile and is passed through to a light bulb for illumination of a visor mirror 72 in the vanity 58. It should be noted that the visor, pivot rod and bracket may be made of any known material such as but not limited to plastic, ceramic, composites, metals, or natural material, etc.

The visor pivot rod 32 is arranged over a floating carrier 34, which is arranged within the channel 40 of the shell halves 36, 38 of the visor body 42. The floating carrier 34 may achieve a flexible design foundation and be capable of self aligning while transforming lateral and vertical variations into a single resultant force factor that is perpendicular to a spring 96 arranged within the floating carrier 34. The floating carrier 34 may have a first and second surface 98 arranged near a top end thereof, which may be arranged at an approximate 45° angle with respect to a center line of the floating carrier 34. It should be noted that any other angle from 0° to 360° may be used for the surfaces 98 and the fingers 102. This may allow for interaction with the bearing surfaces 48 on the inner walls of the visor body 42. From a side view the floating carrier 34 may generally have a U-shape with each arm of the U having a first and second ride surface 98 at an approximate 45° angle arranged thereon. The floating carrier 34 also may include a bore 100 therethrough that has a diameter that generally equals the outer diameter of the pivot rod 32. This allows the floating carrier 34 to slide with respect to the pivot rod 32. Arranged on each outer lower edge of the floating carrier 34 may be a finger 102, which is capable of flexing with relation to the body 42 of the floating carrier 34. These fingers 102 also may be arranged at an approximate 45° angle in order to interact with the angled bearing surfaces 48 located within the channel 40 of the visor half shells 36, 38. These fingers 102 may be arranged on each lower edge of the floating carrier 34 while the riding surfaces 98 are arranged on the top outside edge of the floating carrier 34. It should be noted that the floating carrier 34 may also have a plurality of pads extending from an outside surface of the floating carrier 34 to help with alignment and ride efforts of the floating carrier 34 with respect to the channel 40 of the visor body 42. Generally, the fingers 102 of the floating carrier 34 may not engage with or have any outward force onto the angled surfaces 48 of the visor body 42. In order to achieve an outward force from the fingers 102 of the floating carrier 34 onto the visor body channel 40, a spring 96 is arranged within an orifice at each end of the floating carrier 34. This spring 96 is arranged between an arcuate surface of the floating carrier 34 body and the inner surfaces of the fingers 102 arranged at each end of the floating carrier 34. In one contemplated embodiment, the spring 96 is made of a EPDM rubber material and is easily adjustable in order to change normal force which directly influences slide on rod efforts for the sliding visor 30. This rubber spring 96 may provide a dampening spring force with a consistent force/deflection curve over a wide range of environmental conditions and also has excellent resistance to creep and memory set under compression. It should be noted that generally the spring 96 has a shape of a cylinder. This cylinder may either be hollow or solid. In one contemplated embodiment as shown, the spring 96 may have a predetermined sized orifice 104 arranged at a mid point of the spring 96. The opposite end of the spring 96 may have a male locking member 106 extending therefrom and is received into a female locking orifice arranged on an inner surface of the floating carrier 34. This will ensure that the spring 96 is secured and arranged at a predetermined position with respect to the fingers 102 and the outer edge of the floating carrier 34 on each side. It should be noted that the spring 96 is designed to also act as an integrated bumper to provide cushion and stop points at stowed and retracted positions for the sliding visor 30. This dampening property of the bumper also helps absorb and resist input vibration signals that result in flutter and general noise issues with the visors. The spring 96 may extend a predetermined distance from the outer edge of the floating carrier 34. The spring 96 then may engage with a stop arm 60 arranged near the channel 90 as described above in the visor body 42. Hence, the floating carrier 34 may stop when the spring 96 engages the stop arm 60 and not when the floating carrier 34 body engages the stop arm 60, thus reducing noise and vibrations of the visor. It should further be noted that each of the fingers 102 may have an integrated detent 106 arranged at an end thereof. This detent 106 may interact with a predetermined shaped orifice or cavity arranged near the ends of the angled bearing surfaces 48 of the visor body 42. This use of the detent 106 interacting with the cavity or similar surface on the angled surfaces 48 of the visor body 42 may assist with the stop arm 60 and spring 96 from stopping and absorbing input vibrations and noises when the sliding visor 30 is moved to its retracted or stowed position. It should be noted that the sliding carrier 34 generally has a rectangular shape, with a cut out that generally forms a U when viewed from the side, but may be of any other known shape and may have any length or width and height depending on the design requirements and size of the visor 30. As stated above, the floating carrier 34 generally is made of a plastic material, however any other ceramic, metal, composite, or natural material may also be used to form the floating carrier 34. The floating carrier 34 may also include a plurality of orifices through surfaces thereof.

The sliding visor 30 of the present invention also may include a floating detent 108 which is independent of the floating carrier 34 and hence, there is no interface via rivets or fasteners with the floating carrier 34. Generally, the detent 108 is arranged and engaged with an outer surface of the pivot rod 32 and within the floating carrier 34. The detent 108 does not connect to the floating carrier 34 via a rivet or other fastener, but is locked into the floating carrier 34 via its shape. Its shape generally is that of an oval when viewed from a cross sectional side view. One end of the detent 108 may have a locking clasp mechanism, which may also engage with a bottom surface or inner surface of the floating carrier 34 to create the floating detent 108 independent of carrier interface that is required. This may create low effort for the detent 108 and rotation thereof with respect to the pivot rod 32. It should be noted that any other shape detent 108, such as the detents used by the Applicant in previous visors, may also be used according to the present invention. It is also contemplated to have a detent 108 that is secured to the floating carrier 34 by either a rivet or other fastener and is not a floating detent 108 as described herein. Generally, the detent 108 is made of a steel material, however any other known material such as plastic, ceramic, composite, or any other metal or natural material may also be used for the detent 108 according to the present invention.

The sliding visor 30 also may include a wire routing system that passes a wire 74 from the bracket 88 through the pivot rod 32 to the vanity light 110 for illumination of a vanity mirror 72 therein. In one contemplated embodiment, a pivot point lever arm 112 may be pivotally connected to one end of the floating carrier 34 via orifices arranged within the floating carrier 34. The pivot point lever arm 112 generally may have a predetermined arc shape when viewed from a side. This bent or arced shape may allow for clearance of the pivot arm 112 with inside surfaces of the visor body 42 when the floating carrier 34 is moved from a stowed to a retracted position. The wire 74 passes from the pivot rod 32 into the floating carrier 34 and then to the opposite end of the pivot point lever arm 112, which is not attached to the floating carrier 34. The end of the pivot point lever arm 112 may have a slot or other holding arrangement thereon to allow for the wire 74 to pass therethrough and to be routed in a predetermined manner from the sliding floating carrier 34 to the fixed vanity mirror light 110. It should be noted that the pivot point lever arm 112 may be straight or have any other known arc or curve therein depending on the design of the visor. The use of this pivot point lever arm 112 may hold the wire 74 securely during the sliding movement of the floating carrier 34. It should be noted that it is contemplated to have the wire 74 pass through a hollow portion or bore of the pivot point lever arm 112 to the end of the pivot point lever arm 112 and then to the light 110 of the vanity 58 of the visor 30.

Another contemplated embodiment of the visor 30 has a wire routing option in which the wire 74 exits directly out of the end of the floating carrier 34 into a tube protector 114. In one contemplated embodiment, it is a stiff tube protector 114 that may hold the wire 74 straight during the unsupported travel of the floating carrier 34 within the channel 40 of the visor body 42. It is contemplated that the tube protector 114 may maintain a ten time minimum radius as the wire 74 loops through the tube protector 114 into a predetermined space arranged between the two shell halves 36, 38 of the visor body 42. The wire 74 may be moved and guided at a predetermined large radius via surfaces molded into the interior surface of the visor shell halves 36, 38 such that the tube protector 114, which generally is made of a stiff material, will interact with the predetermined molded surfaces to guide the wire 74 during sliding of the visor from a retracted to stowed position. It should further be noted that it is also contemplated to use an onboard electric source to illuminate the light 110 of the vanity 58 for the visor 30. It should be noted that the tube protector 114 may have a predetermined length and diameter which may allow the wire 74 to pass reasonably therethrough. The tube protector 114 may be made of any known plastic, ceramic, composite, metal or natural material depending on the design requirements of the visor 30.

The sliding visor 30 also includes a vanity member 58. The vanity member 58 generally includes a vanity door 116, door springs 118, a vanity frame 70, a vanity mirror 72 with optional lights 110 arranged thereon. If the vanity 58 is illuminated, the vanity 58 may also include at least one lens 120 to disperse light in a predetermined manner. The vanity frame 70 generally may include at least one, but in the embodiment shown, two connecting flanges 122 arranged near or at a bottom surface of the vanity frame 70. On the opposite end of the vanity frame 70 may be arranged at least one locking shoulders or surfaces 132 that may interact with locking tabs arranged on a surface of one of the visor shell halves 36, 38. This will allow for the vanity frame 70 and vanity 38 to be secured to the visor body 42 without fasteners, such as screws, etc. This creates a snap in vanity 58. Generally, the vanity frame 70 and door 116 may have a rectangular or oval shape, however any other shaped vanity 58 may be used depending on the design requirements of the visor 30. The vanity frame 70 may also include a flex hook 124 arranged at one edge thereof and a leaf spring 126 arranged on an opposite edge of the orifice defined in the middle of the vanity frame 70. Adjacent to the leaf spring 126 may be one or two locking tabs 128. This combination of the flex hook 124, leaf spring 126 and locking tabs 128 along with lens 120 tabs that are used to secure the lens 120 to the vanity frame 70, may be used to secure a mirror 72 into a flexible interface without adhesives. In operation, the mirror 72 is placed under the flex hook 124 and then snapped under the locking tabs 128 and against the leaf spring 126 to secure the mirror 72 without adhesives to the vanity frame 70. The lens tabs, generally which are arranged on either side of the vanity frame 70 may keep the vanity mirror 72 positioned properly in a side to side direction with relation to the vanity frame 70. Hence, the vanity mirror 72, which may be of any shape, size or thickness, may be held in place to the vanity frame 70 without adhesives, which are generally used to hold a vanity mirror to a frame in the prior art. It should be noted that any number of leaf springs 126, locking tabs 128 and flex hooks 124 may be used to hold the vanity mirror 72 according to the present invention. The vanity frame 70 may be inserted into the visor body 42 by securing the first and second flanges 122 arranged near one end of the vanity frame 70 underneath inboard hooks 130 that are molded into an outer surface of one of the core visor body half shells 36, 38. These flanges 122 may be arranged under these inboard hooks and then the opposite end of the vanity frame 70 may be snapped into place with a downward force, such that the locking shoulders or surfaces 132 of the vanity frame 70 will interact with the locking tabs or snaps molded onto and into the visor half shell 36, 38 in an outer surface thereof. This may secure the vanity 58 into the visor body 42 with a snap in system that does not require fasteners, such as screws, to secure the vanity system to the visor body 42. It should be noted that the visor half shell that holds and supports the vanity 58 also includes a plurality of arcuate holders to hold and secure the light bulbs 110 used to illuminate the visor vanity mirror 72 with respect to the vanity frame 70. It should be noted that it is also contemplated to have only one light bulb arranged in the visor body 42 or no light bulbs arranged in the visor body 42 and just a vanity mirror 72 arranged therein. All of these surfaces are premolded into the visor half shell 36, 38 into which the vanity 58 will be arranged and secured.

Figure 16:
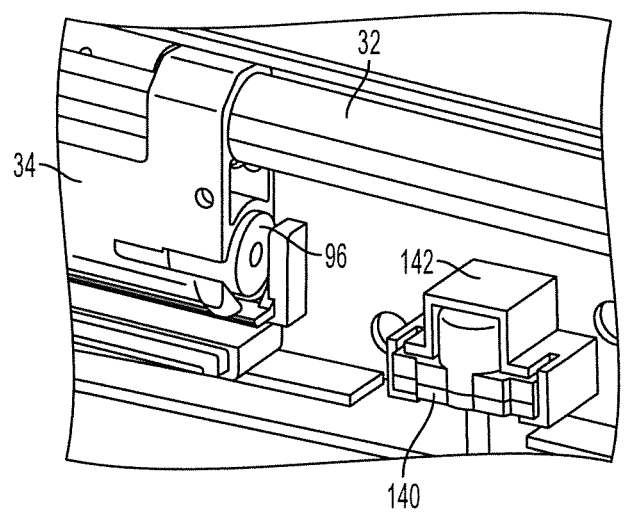
FIG. 16 shows a side view of one half shell of the sliding visor according to the present invention.
Figure 18:
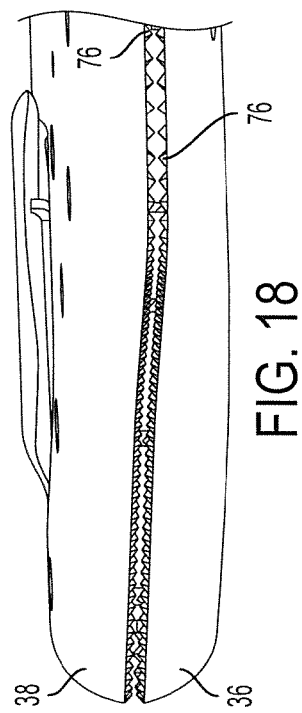
FIG. 18 shows an end view of a visor according to the present invention.
Figure 19:
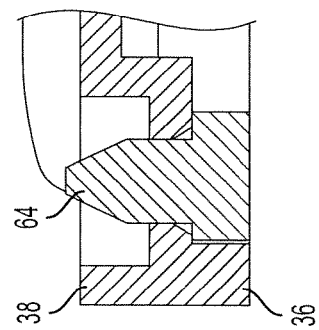
FIG. 19 shows a cross sectional view of a portion of the visor according to the present invention.
Figure 17:
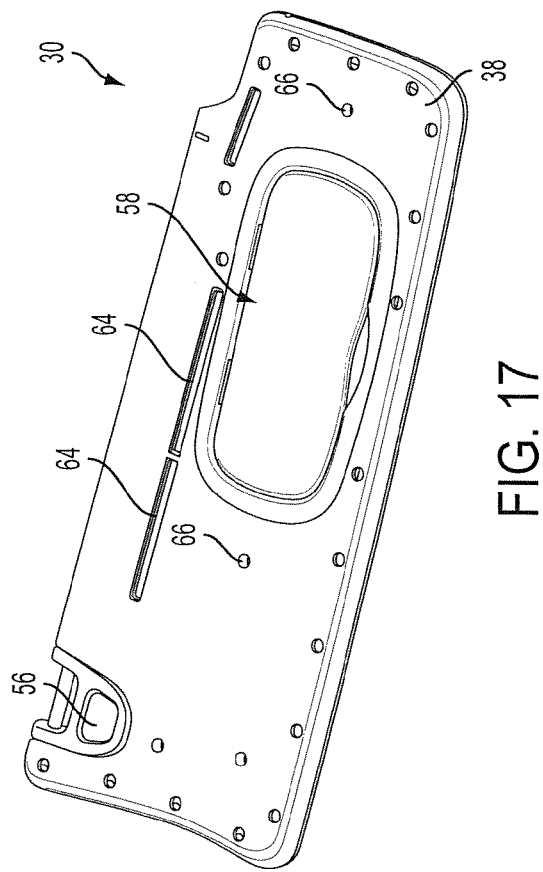
FIG. 17 shows a top plan view of a visor according to the present invention.
Figure 20:
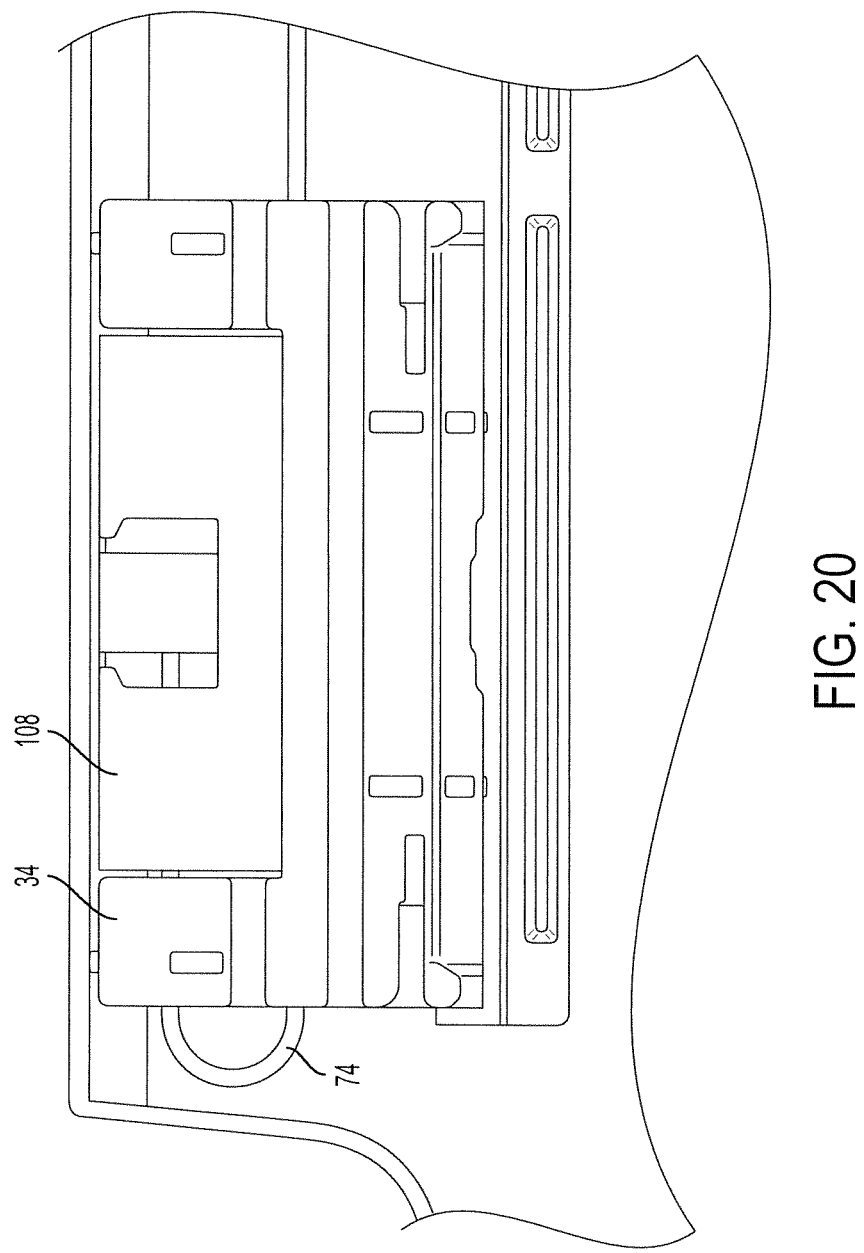
FIG. 20 shows a side view of an alternate embodiment for a floating carrier according to the present invention.
Figure 21:
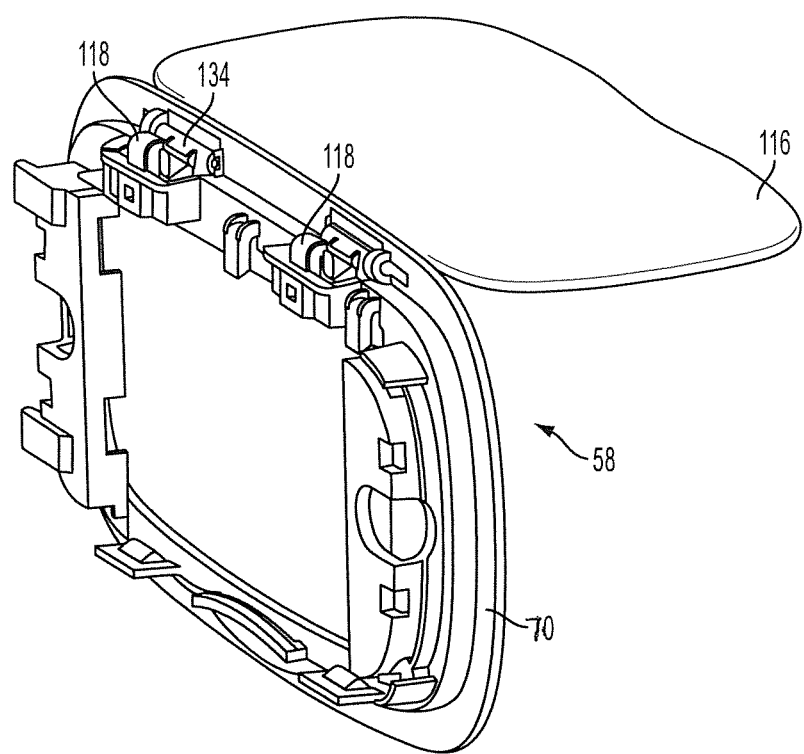
FIG. 21 shows a plan view of a vanity system according to the present invention.
Figure 22:
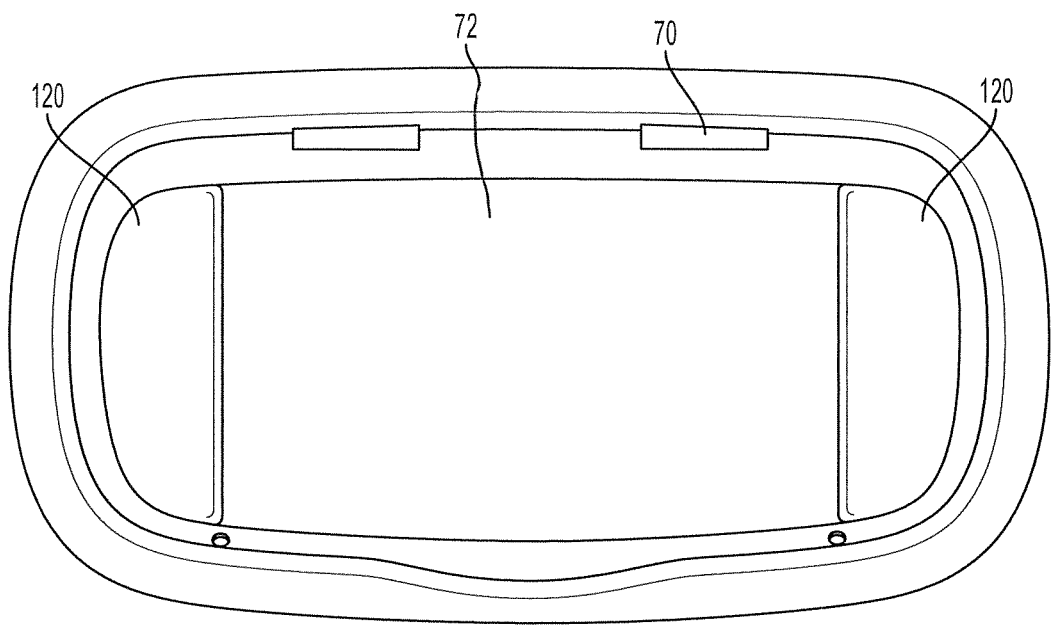
FIG. 22 shows a top view of a vanity frame according to the present invention.
Figure 24:
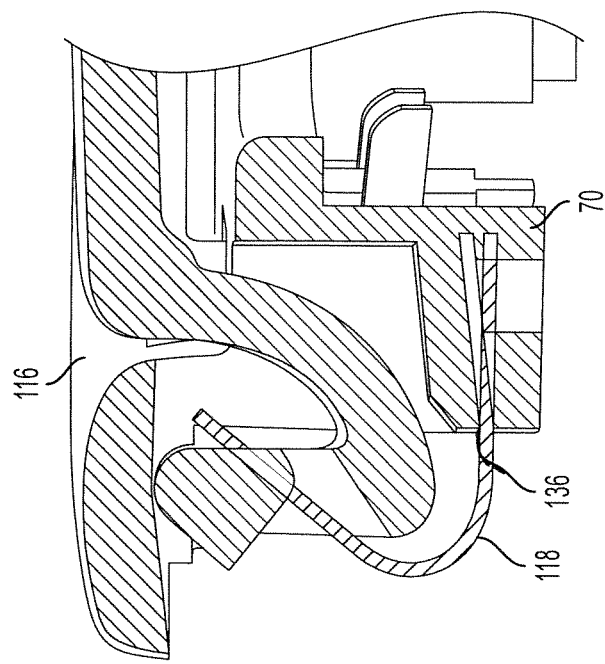
FIG. 24 shows a cross sectional view of a vanity system according to the present invention.
Figure 23:
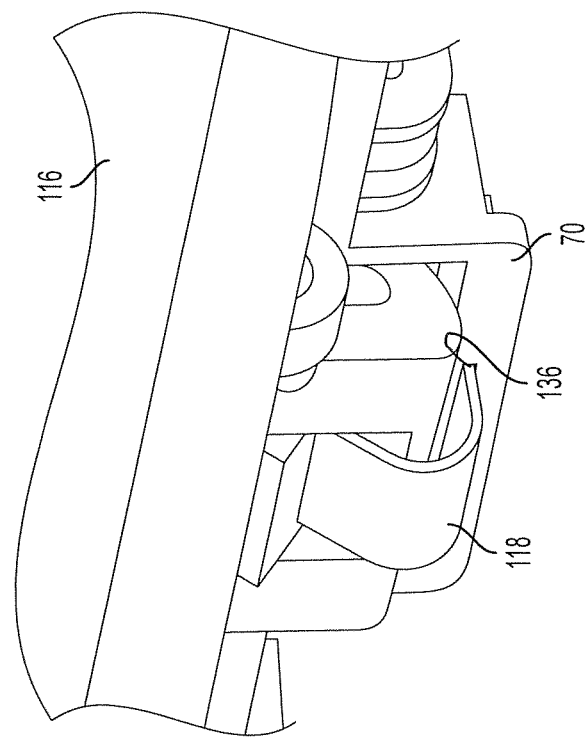
FIG. 23 shows an end view of a vanity frame according to the present invention.
Figure 25:
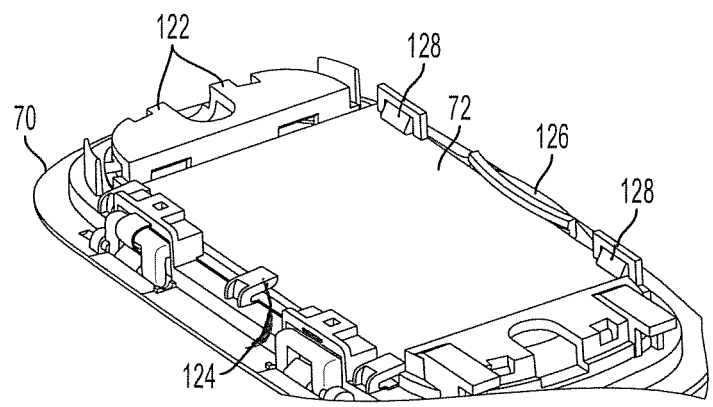
FIG. 25 shows a top view of a vanity system according to the present invention.
Figure 26:
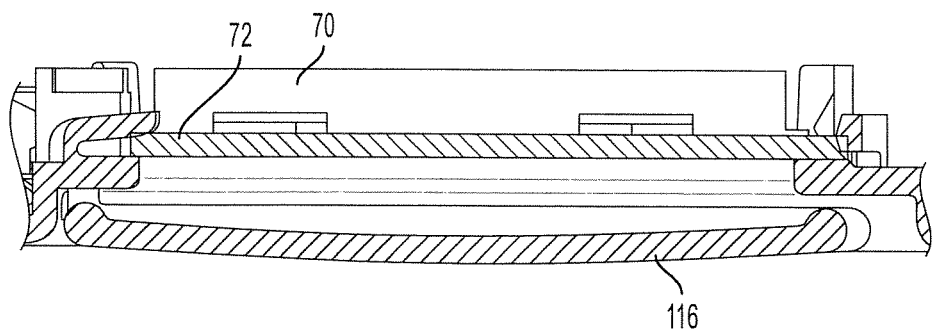
FIG. 26 shows a cross sectional view of a vanity system according to the present invention.
Figure 27:
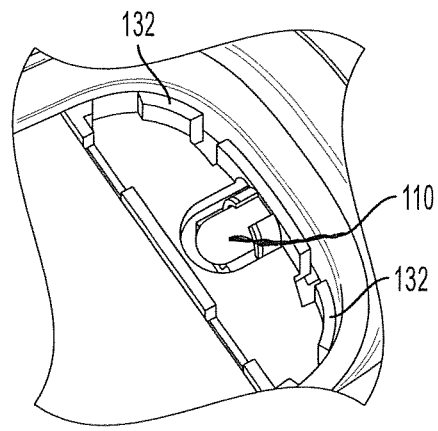
FIG. 27 shows a view of a vanity system according to the present invention.
Figure 28:
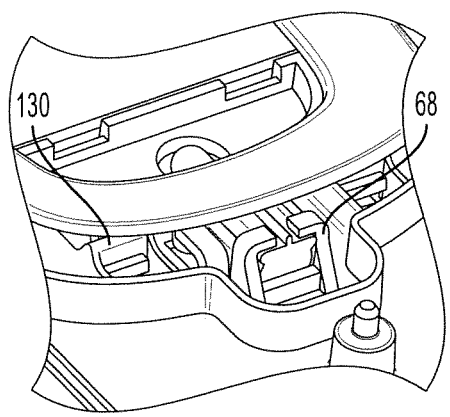
FIG. 28 shows a view of a vanity system arranged within a visor half shell according to the present invention.

The vanity 58 also includes a vanity door 116, which is pivotally connected to the vanity frame 70 via door springs 118. The door springs 118 generally have a C or U shape when viewed from a side. The door spring 118 may use a cam interference to door hinge the vanity system. One end of the vanity spring 118 may be arranged within a surface of the vanity frame 70. The opposite end of the door spring 118 may engage and interact with a cam 134 arranged on a door hinge of the door 116 of the vanity 58. The hinge may have the cam surface 134 adjacent to an orifice through the door hinge, which may allow for the cam interference to create an acting force on the spring 118 which is perpendicular to the pocket 136 rather than the direction of installation. It should further be noted that the door spring 118 may have a sufficient preload or interference between the door and spring to ensure that the door effort does not fall below a predetermined effort. The door 116 may have a first and second door hinge thus needing a first and second door spring 118 arranged into a first and second pocket 136 of the vanity frame 70 and against a cam 134 of the door hinge. The cam 134 of the door hinge may or may not be arranged in the same plane as the door hinge and may or may not be offset from the door hinge. It should be noted that the door 116, vanity frame 70 and all of the other accessories generally are made of a plastic material, except for the door spring 118 which generally is made of a metal material, however any other ceramic, composite, plastic, metal, or natural material may be used for any of the components of the vanity 58, according to the present invention. Generally, arranged adjacent to at least one of the door hinges may be a switch 140 used to close the circuit to illuminate the light 110 of the vanity 58. The switch 140 in one embodiment may be a plunger switch, which when the vanity door 116 is placed in an open position a surface of the vanity door 116, such as one of the hinges, may interact with the plunger switch 140, thus depressing the plunger switch and closing the circuit and illuminating the light bulb or bulbs 110 arranged adjacent to the vanity mirror 72 of the vanity 58. It should be noted that other types of switches may also be used depending on the design requirements of the visor 30. In one contemplated embodiment as shown in FIG. 16, a pocket 142 may be premolded into one of the inner surfaces of one of the clam shell halves 36, 38 to hold the plunger switch 140 which is used to operate and illuminate the lights on the vanity system 58. It should be noted that any other known switch may also be used to operate and activate the light 110 in the vanity system 58.

The present invention has been described in an illustrative manner. It is to be understood that the terminology which has been used is intended to be in the nature of words of description rather than that of limitation.

Many modifications and variations of the present invention are possible in light of the above teachings. Therefore, within the scope of the appended claims, the present invention may be practiced otherwise than as specifically described.

What is claimed is:

1. A vanity for use with a visor in a vehicle, said vanity comprising:
   a frame;
   a door pivotally connected to said frame;
   a mirror arranged in and secured to said frame in part by a flex hook,
   a spring arranged on said frame, said spring is in contact with said mirror, and
   a connecting flange arranged from a bottom surface of said frame.

2. The vanity of claim 1 further comprising a door spring arranged between said frame and said door.

3. The vanity of claim 1 further comprising a light and a lens.

4. The vanity of claim 1 further comprising a locking shoulder arranged on said bottom surface of said frame.

5. The vanity of claim 4 wherein said locking shoulder is arranged on an opposite end of said frame from said connecting flange.

6. The vanity of claim 5 wherein said locking shoulder and said connecting flange form a snap in vanity, the vanity is secured to the visor without fasteners.

7. The vanity of claim 1 further comprising a locking tab adjacent to said spring, said locking tab and said spring in part secure said mirror to said frame.

8. The vanity of claim 3 wherein said lens having a lens tab, said lens tab in part positions said mirror with respect to said frame.

9. The vanity of claim 2 wherein said door spring having a generally U-shape when viewed from a side.

10. The vanity of claim 9 wherein an end of said door spring is arranged in a pocket of said frame.

11. The vanity of claim 10 further comprising a cam arranged on said door, said door spring having another end engaged with said cam.

12. The vanity of claim 11 wherein said door spring having a cam interference to a door hinge, which creates a perpendicular force with respect to said pocket.

13. A visor for a vehicle, said visor comprising:
   a first and second shell being engagable to form a visor body;
   a vanity secured to said visor body;
   said vanity comprising:
      a frame;
      a door pivotally connected to said frame;
      a mirror arranged in and secured to said frame in part by a flex hook;
      a spring arranged on said frame, said spring is in contact with said mirror;
      a connecting flange arranged from a bottom surface of said frame; and
   a locking surface arranged on one of said shells of said visor body, said locking surface interengages with and contacts said connecting flange to in part secure said vanity to said visor body.

14. The visor of claim 13 further comprising a vanity locking shoulder arranged on said frame.

15. The visor of claim 14 wherein said vanity locking shoulder is arranged on an opposite end of said frame from said connecting flange.

16. The visor of claim 14 further comprising a visor body locking tab arranged on a surface of one of said shells.

17. The visor of claim 16 wherein said visor body locking tab interengages with and contacts said vanity locking shoulder to in part secure said vanity to said visor body with a snap in system that does not use fasteners.

18. The visor of claim 13 further comprising vanity locking tab arranged on said frame, said spring and said vanity locking tab in part secure said mirror to said frame without adhesives.

19. The visor of claim 13 further comprising a door spring having a generally "C" or "U" shape when viewed from a side, one end of said door spring arranged in a pocket of said frame, another end of said door spring engages and interacts with a cam of said door.

\* \* \* \* \*